United States Patent
Kasrai

[19]

[11] Patent Number: 6,016,334
[45] Date of Patent: Jan. 18, 2000

[54] METHOD AND SYSTEM FOR AUTOMATICALLY VERIFYING PROVISIONING OF TELECOMMUNICATIONS SERVICES

[75] Inventor: Shahrooz S. Kasrai, Dallas, Tex.

[73] Assignee: Alcatel USA Sourcing, L.P., Plano, Tex.

[21] Appl. No.: 08/960,051

[22] Filed: Oct. 29, 1997

[51] Int. Cl.[7] .................................................. H04M 3/42
[52] U.S. Cl. .............................. 379/15; 379/10; 379/13; 379/207
[58] Field of Search .............................. 379/1, 9–15, 16, 379/111, 112, 113, 134, 133, 201, 202, 229, 230

[56] References Cited

U.S. PATENT DOCUMENTS

| | | | |
|---|---|---|---|
| 5,369,680 | 11/1994 | Borbas et al. | 379/13 |
| 5,761,272 | 6/1998 | Williams et al. | 379/15 |
| 5,787,147 | 7/1998 | Gundersen | 379/10 |
| 5,809,108 | 9/1998 | Thompson et al. | 379/15 |

*Primary Examiner*—Paul Loomis
*Attorney, Agent, or Firm*—Baker & Botts, L.L.P.

[57] ABSTRACT

A method for automatically verifying provisioning of a telephony database includes receiving from the telephony database a first table structure for a first table within the telephony database and automatically generating, based on the first table structure, a test provisioning message operable to provision a table having the first table structure. The method also includes automatically generating an expected response to the test provisioning message and transmitting the test provisioning message. The method further includes receiving an actual response to the test provisioning message, comparing the actual response to the expected response, and generating a result based on comparing the actual response to the expected response.

20 Claims, 8 Drawing Sheets

FIG. 3

DATABASE 206

TABLES 302: ROAMING, CALL FORWARDING, 1-800 SERVICE

1-800 SERVICE TABLE 304

| CUSTOMER NAME | DESTINATION (314) | ENABLED? (316) | CALLED NUMBER (312) | BILLING ZIP CODE | CUSTOMER NUMBER |
|---|---|---|---|---|---|
| JOHN DOE | 972-234-5678 | 1 | 1-800-123-4567 | 75201 | 101 |
| JANE SMITH | 214-444-4444 | 1 | 1-800-555-5555 | 75062 | 102 |
| BOB JONES | 210-123-4567 | 1 | 1-888-123-4567 | 78230 | 103 |
| MARY BLACK | 512-333-3333 | 0 | 1-888-555-5555 | 78355 | 104 |

RECORDS OR TUPLES 306

310 ENTRIES (each column)

308 FIELDS OR ATTRIBUTES

METHOD AND SYSTEM FOR AUTOMATICALLY VERIFYING PROVISIONING OF TELECOMMUNICATIONS SERVICES

RELATED APPLICATIONS

This application is related to patent application Ser. No. 08/960,326, filed Oct. 29, 1997, entitled Method and System for Provisioning Telecommunications Services, now pending; patent application Ser. No. 08/960,013, filed Oct. 29, 1997, entitled Method and System for Communicating Telecommunications Provisioning Information, now pending; and patent application Ser. No. 08/960,174, filed Oct. 29, 1997, entitled Method and System for Testing Provisioning of Telecommunications Services, now pending.

TECHNICAL FIELD OF THE INVENTION

The invention relates generally to telecommunications and more particularly to automatically verifying provisioning of telecommunications services.

BACKGROUND OF THE INVENTION

Consumers of telecommunications services are constantly demanding new and more advanced services to facilitate their personal communications. Examples of such services include call forwarding, personal 1-800 service, roaming services, and caller ID. Advanced telecommunications systems often include a service control point that contains a database. The database may be used in conjunction with many of the advanced services demanded by telephone users. For example, a service switching point (SSP) may transmit a dialed 1-800 number to a service control point to receive the actual routing number associated with the dialed 1-800 number. The actual routing number may vary, depending upon, for example, the time the dialed 1-800 number call was placed or the originating location of the dialed 1-800 number. A database in the service control point is accessed with the dialed 1-800 number, and information associated with that 1-800 number and an appropriate routing number is selected from the database for transmission back to the service switching point.

A customer of a telecommunications system such as, for example, MCI, Sprint, AT&T, or GTE, may place customer information into the database by accessing the service control point. Examples of placing information into the database in the service control point include adding subscriber names and information associated with the subscriber and updating current entries to reflect changes in data associated with a subscriber. The placing or modifying of information contained within a database in the service control point is commonly referred to as database provisioning.

Database provisioning is required both when new services are made available to a subscriber and when subscriber information is changed. New services are created in a service creation environment by, for example, the designer and operator of a telecommunications system, such as, for example, DSC Communications Incorporated. The new services are created in the service creation environment and the database in the service control point is modified to reflect the new services.

Consumers of telecommunications services are constantly demanding new and more advanced services to facilitate their personal communications. Examples of such services include call forwarding, personal 1-800 service, roaming services, and caller ID. Advanced telecommunications systems often include a service control point that contains a database. The database may be used in conjunction with many of the advanced services demanded by telephone users. For example, a service switching point (SSP) may transmit a dialed 1-800 number to a service control point to receive the actual routing number associated with the dialed 1-800 number. The actual routing number may vary, depending upon, for example, the time the dialed 1-800 number call was placed or the originating location of the dialed 1-800 number. A database in the service control point is accessed with the dialed 1-800 number, and information associated with that 1-800 number and an appropriate routing number is selected from the database for transmission back to the service switching point.

A customer of a telecommunications system such as, for example, MCI, Sprint, AT&T, or GTE, may place customer information into the database by accessing the service control point. Examples of placing information into the database in the service control point include adding subscriber names and information associated with the subscriber and updating current entries to reflect changes in data associated with a subscriber. The placing or modifying of information contained within a database in the service control point is commonly referred to as database provisioning.

Database provisioning is required both when new services are made available to a subscriber and when subscriber information is changed. New services are created in a service creation environment by, for example, the designer and operator of a telecommunications system, such as, for example, DSC Communications Incorporated. The new services are created in the service creation environment and the database in the service control point is modified to reflect the new services.

Conventional methods for testing provisioning of telecommunications services suffer several disadvantages. For example, conventionally when a database is modified to accommodate new telecommunications services, a new protocol for communication between a user and the modified database is required for provisioning of that database. Because a new protocol is required each time a database is modified to accommodate new telecommunications services, determining whether a database has been properly provisioned is difficult. For example, to determine whether a database has been properly provisioned, it may be necessary to determine expected responses to test messages sent to the database. Because the protocol is modified each time the database is modified, determining the expected responses can be difficult and time consuming, particularly when a large number of test messages and responses are required to completely test provisioning of a telecommunications service.

SUMMARY OF THE INVENTION

From the foregoing it may be appreciated that a need has arisen for automatically verifying provisioning of telecommunications services that addresses the disadvantages of prior systems and methods.

According to an embodiment of the present invention, a method for automatically verifying provision of a telephony database includes receiving from the telephony database a first table structure for a first table within the telephony database. The method also includes automatically generating, based on the first table structure, a test provisioning message operable to provision a table having the first table structure. The method also includes automatically generating an expected response to the test provisioning message and transmitting the test provisioning message. The method also includes receiving an actual response to the test provisioning message and comparing the actual response to the expected response. The method further includes generating a result based on comparing the actual response to the expected response.

According to another embodiment of the present invention, a system for verifying provisioning of telecommunications services includes a first telecommunications node that includes an automatic testing unit and an automatic verification unit. The automatic testing unit is operable to transmit test messages to a provisioning unit for confirming provisioning of a database associated with telephony services and is also operable to receive actual responses to the test messages. The automatic testing unit is also operable to compare the actual responses to the expected responses and generate a result based on the comparison on the actual responses to the expected responses. The automatic verification unit is operable to receive a table structure for the database and automatically generate a plurality of test messages and expected responses based on the table structure for transmission to the automatic testing unit. The system also includes a second telecommunications node that includes the database.

The invention provides several technical advantages. For example, the invention allows a rapid method for testing provisioning of telecommunications services. Once a database has been provisioned, it may be quickly tested without having to generate format-specific test messages and expected responses. The avoidance of generating such format-specific test messages and expected responses reduces the cost of implementing telecommunications services and time delay associated with bringing new telecommunications services to market.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 3 is a simplified block diagram of the service control point illustrated in FIG. 1 showing additional details of tables contained within a database in the service control point;

DETAILED DESCRIPTION OF THE INVENTION

Figure 1:
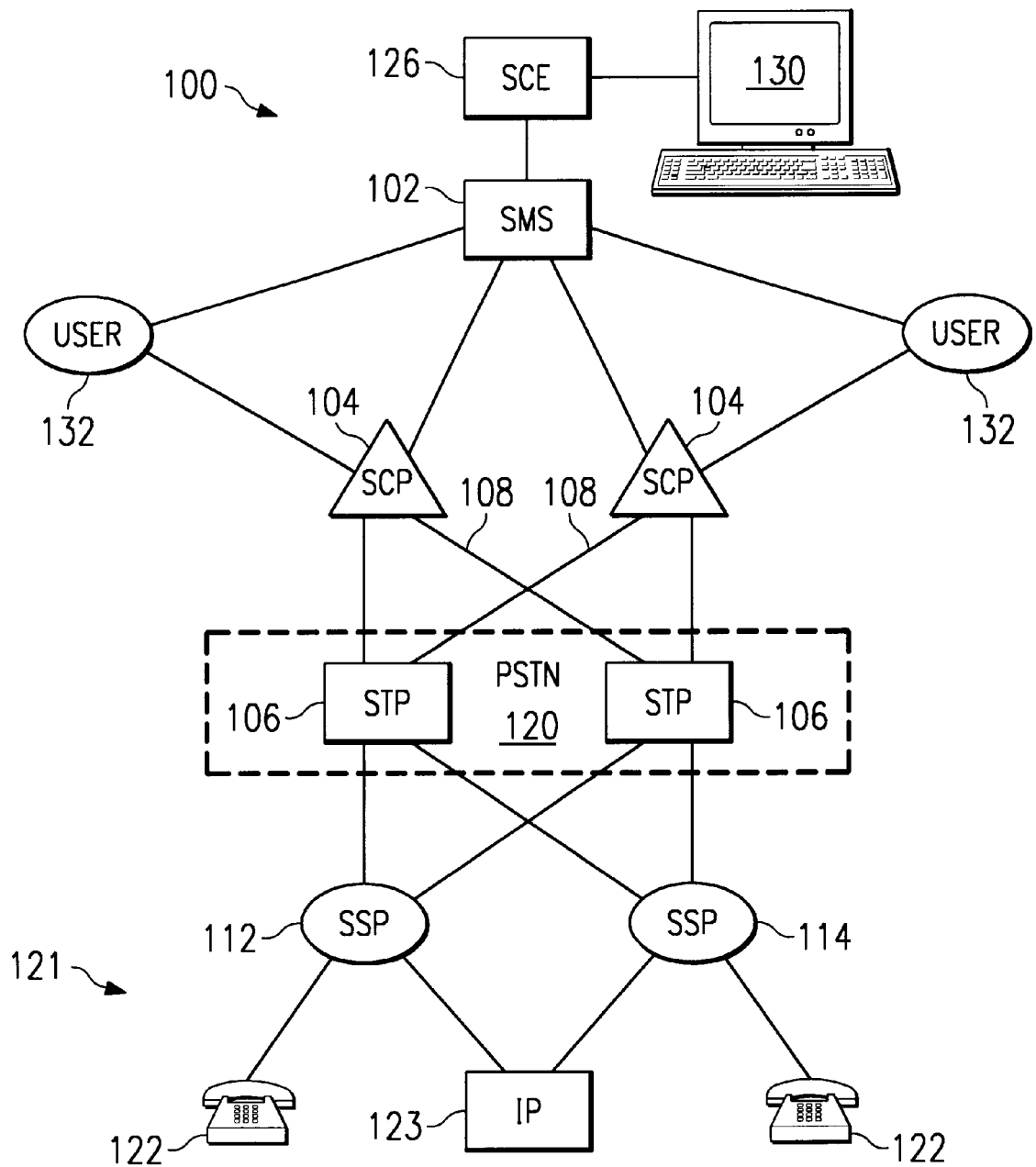
FIG. 1 is a block diagram of an exemplary telecommunications network such as an advanced intelligent network (AIN)

Embodiments of the present invention are illustrated in FIGS. 1 through 8B, like reference numerals being used to refer to like and corresponding parts of the various drawings.

FIG. 1 is a block diagram of a telecommunications network 100, such as an advanced intelligent network (AIN). Telecommunications network 100 includes a service management system 102 that interfaces with a plurality of service control point systems or service control points (SCP) 104 and a plurality of signal transfer point systems or signal transfer points (STP) 106 via an industry standard protocol, such as X.25. Service management system 102 provides network information, database management, and administrative support for telecommunications network 100. Service management system 102 generally interfaces with service control points 104 for provisioning, database management, service control point application program management, and collecting traffic metering measurement data. Service control points 104 may also be directly linked to signal transfer points 106 via a signaling system number 7 (SS7) link set 108. Signal transfer points 106 are further coupled through signaling system number 7 link set 108 to one or more service switching points 112 and 114, which perform switching and call handling functions in the network. Service control points 104 are transaction based processing systems whose primary responsibility is to respond to queries from service switching points 112 and 114 for data needed to complete routing of a call. Service switching points 112 and 114 are part of a public switched telephone network (PSTN) 120 and are coupled to the telephone service subscribers or customers 121, which include wire-based telephones and wireless telephones 122, and intelligent peripherals 123. Service management system 102 and service control point 104 may also be returned as a telecommunications node.

A service creation environment 126 allows the creation of service logic programs that may be downloaded to service control points 104 and signal transfer points 106 through service management system 102 for execution. Programmers of service creation environment may interface with service creation environment 126 through a computer terminal coupled to service creation environment 126.

Figure 2:
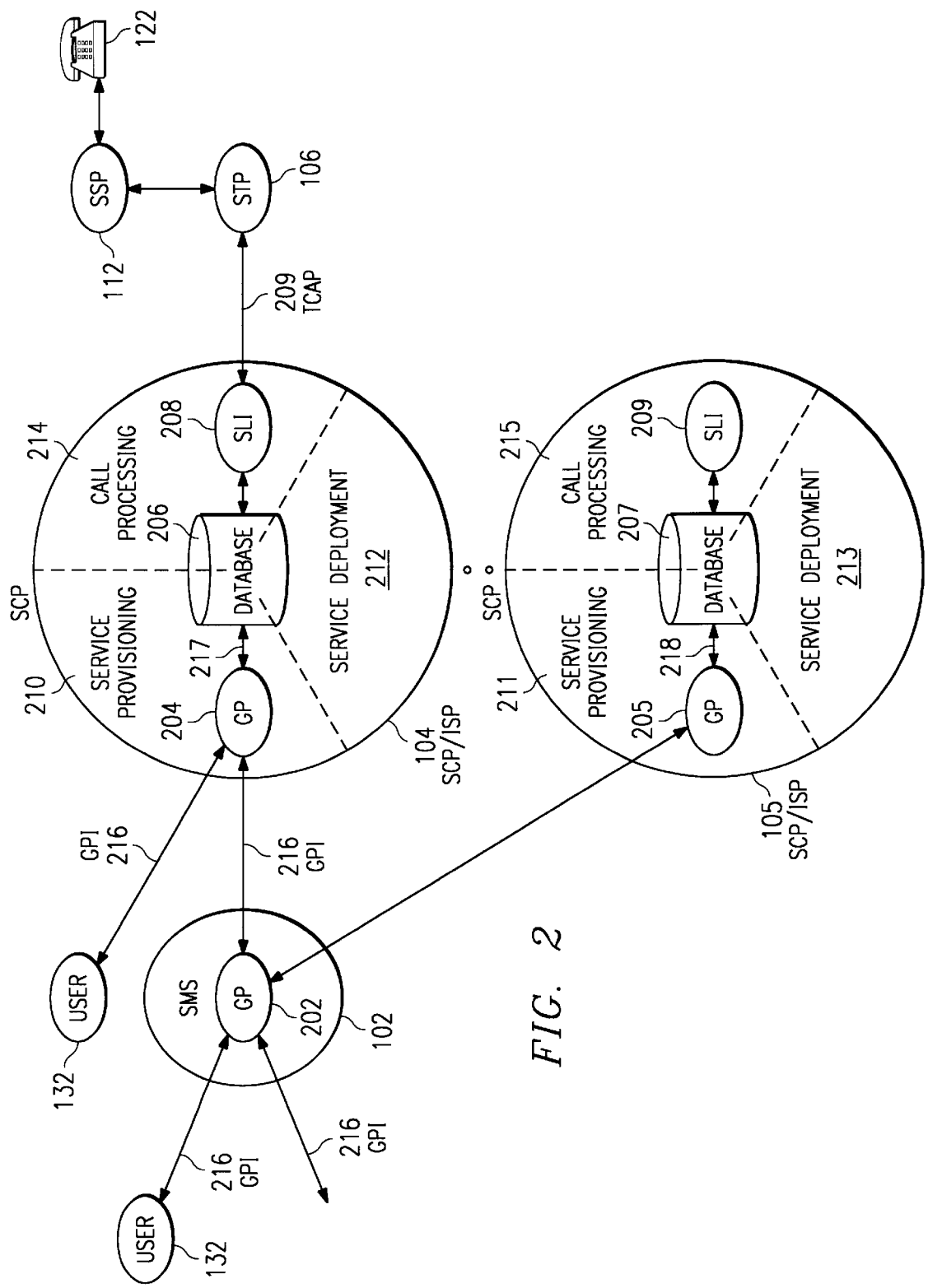
FIG. 2 is a simplified block diagram of a portion of the exemplary telecommunications network illustrated in FIG. 1 showing additional details of the communication of information from a user to a service control point.

FIG. 2 is a simplified block diagram of a portion of telecommunications network 100 illustrated in FIG. 1, showing additional details of the communication of information from a user 132 to a database 206. In this example, database 206 is contained within service control point 104. A second database 207 is contained within a second service control point 105. Service control point 104 is illustrated in FIG. 2 as being in communication with service management system 102 through a generic provisioning interface 216. Service management system 102 may also communicate with a user such as a telecommunications company through generic provisioning interface 216. Example users include MCI, Sprint, AT&T, and GTE, and other telecommunications companies.

Generic provisioning interface 216 is a protocol for communicating between user 132 and generic provisioning unit 202, 204. Through communication with service management system 102, user 132 may communicate a provisioning message through service management system 102 to service control point 104. Alteratively, as illustrated, user 132 may directly communicate a provisioning message through generic provisioning interface 216 to service control point 104. A provisioning message contains information for populating a database such as database 206. Information contained within database 206 is used in call processing.

As illustrated, service control point 104 may include a service provisioning portion 210, a call processing portion 214, and a service deployment portion 212. Service provisioning portion 210 is associated with provisioning database 206 in support of call services. Call processing portion 214 is associated with handling processing of calls that require database access. Service deployment portion 212 is used for deploying new call services to service control point 104.

Service provisioning portion 210 includes generic provisioning unit 204. Generic provisioning unit 204 receives provisioning messages communicated according to generic provisioning interface 216 and places them in a format that may be understood by database 206 as illustrated by reference numeral 217. Therefore, database 206 may be replaced with a different brand of database 206 without requiring a new generic provisioning interface because generic provisioning unit 204 provides the database-specific translations of messages communicated to generic provisioning unit 204 according to generic provisioning interface 216.

Generic provisioning unit 202, 204 allows service providers, such as user 132, to manipulate subscriber databases, such as database 206. Generic provisioning unit 202, 204 can also retrieve remote site or node information for maintenance purposes. User 132 may send messages to generic provisioning unit 202, 204 in the form of ASCII strings. Generic provisioning unit 202, 204 sends a response message back to the user describing the results of the operations. Generic provisioning unit 202, analogous to generic provisioning unit 204, may also be contained in-service management system 102. Generic provisioning unit 204 may be accessed directly by user 132 through generic provisioning interface 216 or may be accessed indirectly by user 132 through another generic provisioning unit, such as generic provisioning unit 202, contained with service management system 102. Generic provisioning unit 202 is also operable to receive information from user 132, replicate the information, and transmit the information to a plurality of generic provisioning units, such as generic provisioning unit 205 contained within service control point 105.

According to the invention, generic provisioning interface 216 is defined such that it does not have to be modified whenever a database, such as database 206 or database 207 is modified. Modification of a database includes adding a table to a database or changing the format of a table in a database. Table format changes are effected through modification of a service definition table. A service definition table defines table definition information specifying the structure of tables within the database. Thus, new call services can be added rapidly, and database 206 may be updated without the time delay normally associated with adding new call services or updating a database in a service control point due to associated modifications of a communicating interface protocol.

Call processing portion 214 may include a service logic interpreter 208. Service logic interpreter 208 receives, for example, a transaction capabilities application part message 209 related to a telecommunications service. A transaction capabilities application part message is one type of message transmitted according to a signaling system number 7 protocol. The transaction capabilities application part message enables deployment of advanced intelligent network services by supporting non-circuit related information exchanged between signaling points. For example, service switching point 112 may use a transaction capabilities application part to query, through signal transfer point 106, to service control point 104 to determine the routing number associated with a dialed 800, 888, or 900 number. Service control point 104 then uses the transaction capabilities application part to return a response containing the routing number to service switching point 112. Service logic interpreter 208 retrieves, from database 206, the routing number associated with the dialed 800, 888, or 900 number. Thus, service provisioning portion 210 allows database 206 to store information required for call processing portion 214, which enables telecommunications services, such as 1-800 number service, to be enabled.

Generic provisioning units 202, 204, and 205 also operate to update database 206 to perform statistical collection and to provide status reporting and node status information which can be retrieved from service control points, such as service control point 104, via generic provisioning interface 216. For example, the number of calls received at service control point 104 or the number of record updates can be retrieved via generic provisioning interface 216.

Service deployment portion 212 deploys and downloads new or modified services to telecommunications nodes such as service control points and intelligent service peripherals.

FIG. 3 is a simplified block diagram of database 206 illustrated in FIG. 2 showing additional details of tables contained within database 206. Database 206 includes a plurality of tables 302. Each table in the plurality of tables 302 includes information associated with a given service. For example, a separate table may be created for 1-800 service, call forwarding, or roaming. A table 304 is associated with 1-800 service. Table 304 includes a plurality of records or tuples 306. Records 306 correspond to the rows of table 304. Table 304 also includes a plurality of fields or attributes 308. Fields 308 correspond to the columns of table 304. Therefore, table 304 includes a plurality of entries 310, which are individual cells within table 304. The first column in table 304 contains, for example, the names of subscribers. The second column contains the destination number 314 for each customer. The third column contains the called number 312 for each customer, which is the dialed 1-800 or 1-888 number. The fourth column contains the billing zip code for the customer. The fifth line contains a customer number for each customer. The sixth column contains an enablement code 316 for each customer. The enablement code indicates whether a 1-800 or a 1-888 number for a customer is enabled.

According to one embodiment of the invention, an additional service may be readily added for a particular customer by modifying a table, such as table 304, in database 206 to include information required for the additional service, or by creating a new table in database 206. Because database 206 is an open server database, rather than an object-based database, tables 302 in database 206 may be easily amended.

In addition, tables may be easily added, without re-writing code associated with database 206. By contrast, conventionally, object-based databases require modification of computer code to modify an existing table or to add additional tables because an object is created for each table. This causes difficulties because the creation of a new object for each table required modification of the application code. The new object had to be compiled and linked with an application code, which results in code and interface changes. Moreover, some conventional systems utilize relational databases that were communicated to through a system that receives provisioning commands in a format dependent upon the structure of tables within the database. Such systems require modification to an interface for receiving provisioning commands whenever a table is added to a database or the structure at a table is modified in order to provision the modified or added table. Such modifications caused burdensome delay in provisioning databases such as database 206.

Relational databases are one example of an open server database, in which information may be retrieved or added to a database based on the columns and rows of a table. Thus, because the entries of each table may be individually accessed according to column or row, and because generic provisioning interface 216 is defined such that provisioning commands are provided in a format independent of the structure of tables within the database, database 206 may be modified to incorporate new services or to provide new services to a given customer without modification of the computer code associated with the tables. Because such modifications can be made without modifying any computer code associated with each table, communication between database 206 and users 132 may take place according to a constant protocol that does not require amendment upon modification of tables 302.

Figure 4A:
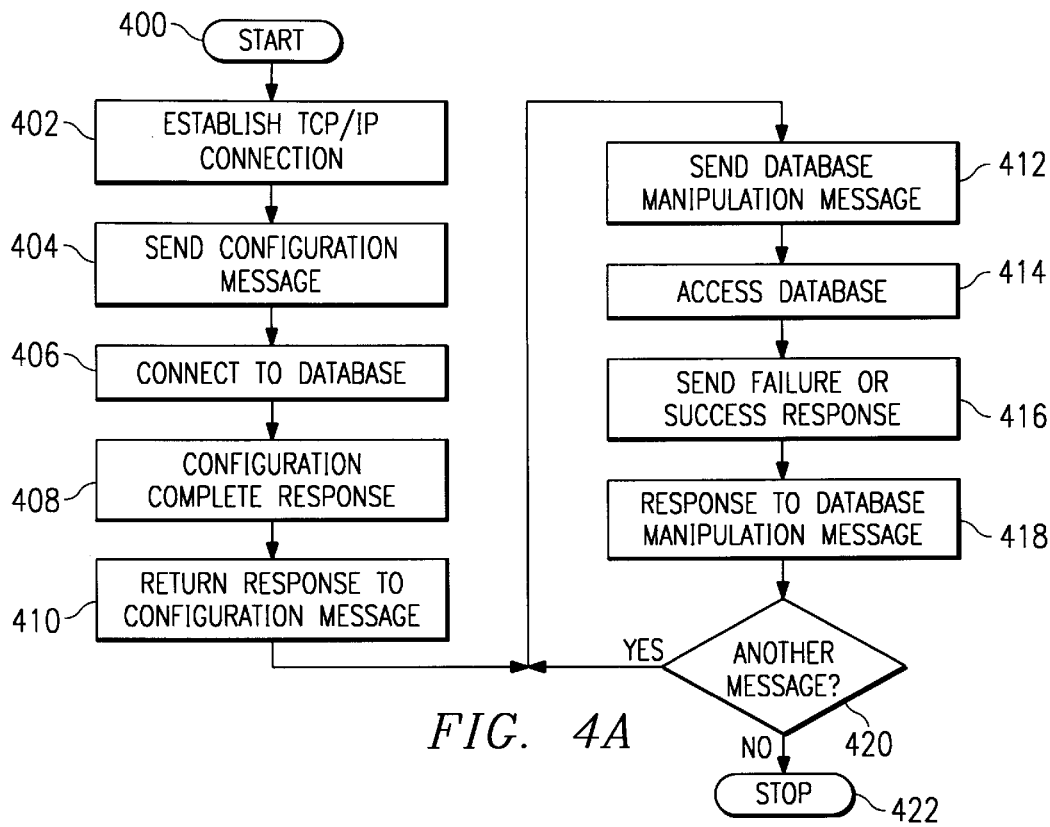
FIG. 4A is a flow chart illustrating exemplary steps associated with the communication of generic provisioning information from a user to a database.
Figure 4B:
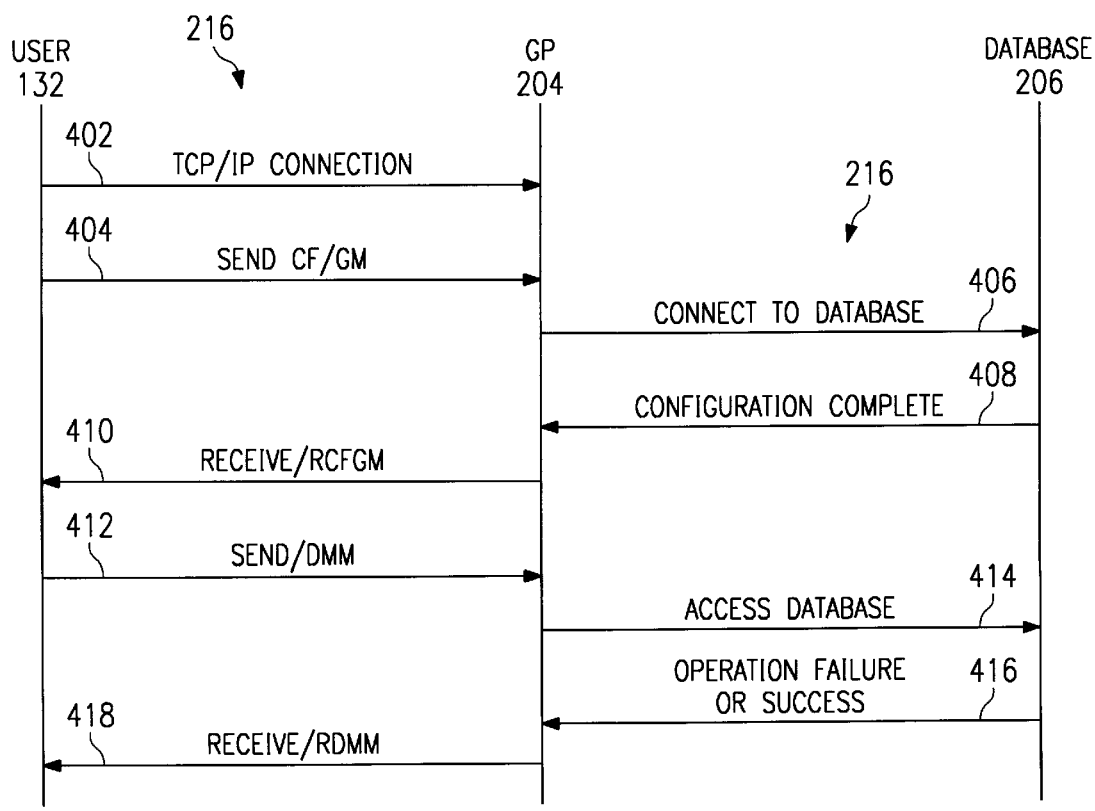
FIG. 4B is a simplified block diagram illustrating an exemplary generic provisioning interface usage.

FIG. 4A is a flow chart illustrating exemplary steps associated with communication of generic provisioning information from user 132 to database 206, and FIG. 4B is a simplified block diagram illustrating an exemplary generic provisioning interface usage. As illustrated in FIG. 4B, user 132 may communicate with database 206 to provision database 206. This communication may take place through generic provisioning unit 202, 204 according to generic provisioning interface 216.

According to one embodiment of the invention, communication according to generic provisioning interface 216 includes step 402 of establishing a TCP/IP connection between user 132 and generic provisioning unit 202, 204. Establishment of a TCP/IP connection between user 132 and generic provisioning unit 202, 204 is also illustrated in FIG. 4B and is represented by reference numeral 402. Establishment of a connection between user 132 and generic provisioning unit 202, 204 may be accomplished by establishing a server connection using a host port number and a host IP address from user 132 to the desired generic provisioning unit 202, 204. The host port number is the generic provisioning TCP/IP socket port number associated with the service control point, service management system, or other telecommunications node containing the desired generic provisioning unit 202, 204. The host IP address is the node IP address of the service control point, service management system, or other communication node containing the desired generic provisioning unit 202, 204. According to one embodiment of the invention, data packet format according to generic provisioning interface 216 provides that a data packet includes two parts: a header and user data. The first four bytes of a data packet represent the header. The header specifies the size of the user data. The remaining bytes of a data packet include user data. User data includes generic provisioning messages.

Once a TCP/IP connection has been established between user 132 and generic provisioning unit 202, 204, database 206 may be accessed. Accessing database 206 may be effected, in part, by step 404 of transmitting login information in a configuration message sent by user 132 to generic provisioning unit 202, 204. The transmitting of such a configuration message is illustrated in FIG. 4B by reference numeral 404. Details of one embodiment of a configuration message are described in greater detail below. Based on the configuration message, a connection to database 206 may be established at step 406. The establishment of a connection to database 206 is also illustrated in FIG. 4B by reference numeral 406. Once database 206 is accessed, a configuration complete response is sent at step 408 from database 206 to generic provisioning unit 202, 204. This response is transmitted from generic provisioning unit 202, 204 to user 132 at step 410. A configuration complete response is transmitted to provide user 132 an indication that database 206 is ready to receive messages, such as provisioning messages. The sending and receiving of a response to a configuration message is also illustrated in FIG. 4B by reference numerals 408 and 410.

Once the response to the configuration message is received, a provisioning message such as a data manipulation message may be sent at step 412 by user 132 to generic provisioning unit 202, 204 for transmittal to database 206. The sending of a data manipulation message is also illustrated in FIG. 4B by reference numeral 412. Database 206 is then accessed by generic provisioning unit 202, 204 at step 414 with the data manipulation message indicated by reference numeral 414.

As described in greater detail below, a data manipulation message updates database 206. Updating database 206 may include adding new records 306, deleting existing records 306, and modifying fields 308 of existing records 306. An example data manipulation message may take the form of: "MSGT=DMM, SQN=000001, SQL=insert FP (called_no, destination, disabled, values('18006120269', '9725193464', 1)." This message inserts a record into a table named "FP." In the above message, the term "MSGT" corresponds to the message type and the term "DMM" specifies a data manipulation message type. In the above example transaction, the term "SQN" corresponds to the sequence number. A sequence number is a way for user 132 to correlate messages and responses. In the above example, the term "SQL" refers to a single Standard Query Language transaction. Standard Query Language is a common language used to communicate with databases. Although the standard query language is used in one embodiment, other suitable standard database language may be incorporated with the teachings of the present invention.

In the above example, the phrase "insert FP (called_no, destination, disables)" is a single Standard Query Language statement. The phrase "insert FP" specifies the insertion of information into a "free phone table." In this example, a free phone table corresponds to 1-800 service table 304, illustrated in FIG. 3. The term "(called_no, destination, disabled)" specifies the fields 308 corresponding to the data to be inserted. For example, the "called_no" entry corresponds to the called number field 312. The term "destination" corresponds to destination field 314, and the term "disabled" corresponds to enablement field 316. The phrase, "values ('18006120269', '9725193464', '1');" provides the values corresponding to the fields specified by the insert command. In this example, the value 18006120269 would be inserted into called number field 312; the value 9725193464 would be inserted into destination field 314; and the value "1" would be inserted into the enablement field 316. In such a way, a data manipulation message may insert a new record 306 into a particular table such as 1-800 service table 304.

According to one embodiment of the invention, a plurality of rules apply to database manipulation messages. First, a database manipulation message does not permit record retrieval. If a user attempts record retrieval, generic provisioning unit 202, 204 returns a response to a database manipulation message with a result code set to "operation not allowed." In addition, all standard query language transactions are limited to insert, update, and delete. All other transactions are not allowed. If user 132 attempts other operations in the standard query language transaction, generic provisioning unit 202, 204 returns a response to database manipulation message with a result code set to "operation not allowed." Although a particular embodiment of a database manipulation message has been particularly described, changes may be made without departing from the scope of the present invention.

All table 304, record 306, and field 308 constraints are handled by constraints defined in schemas and triggers. For example, an attempt to insert a value into a column that is a different type or size will be prevented by a trigger. A trigger is a constraint on how a database may be operated upon. In one embodiment, a database manipulation message size must not exceed 300 k bytes. If the database manipulation message size is larger than 300 k bytes, generic provisioning unit 202, 204 returns a response to database manipulation message with a result code set to "invalid msg size" and the lowest sequence number found. When a database manipulation message is sent to all sites, generic provisioning unit 202, 204 waits for a successful response from each site before sending a response message. If the operation is not successful at all sites, generic provisioning unit 202, 204 sends a "partial successful" response and logs to an error file the message and the site name that did not operate successfully.

Provisioning message types in addition to a database manipulation message type include a response to a data manipulation message, a record retrieval message, a response to a record retrieval message, configuration message, discussed above, and a response to a configuration message. As described above, a data manipulation message updates database 206. A record retrieval message retrieves a single record from database 206. A configuration message configures and programs generic provisioning unit 202, 204. Details concerning each of these message types are described below.

In addition to provisioning messages, generic provisioning interface 216 also provides an interface for transmitting and receiving maintenance messages. Maintenance messages include a site name retrieval message, a response to a site name retrieval message, an active and in-service platform manager retrieval message, a response to an active and in-service platform manager retrieval message, an all node information retrieval message, and a response to all node information retrieval message. A site name retrieval message retrieves the local site name or all remote site names. An active and in-service platform manager retrieval message retrieves the active and in-service platform manager node for a given site name. An all node information retrieval message retrieves all node information for a given site. Details concerning each of these message types are described below.

In addition to adding a new record to a given table, generic provisioning interface 216 allows a modification of record 306, including the deletion of a record from a particular table. For example, the phrase "MSGT=DMM, SQN=000002, SQL=update FP set destination=9725193000 where called-no=18006120269; SQN=000003, SQL=delete FP where called_no=18002336666;" specifies the modification of destination field 314 corresponding to called number field 312 having a value of 18006120269. In addition, this phrase deletes record 306 corresponding to called number field 312 having a value of 18002336666.

More than one command may be executed in a single transaction. For example, the phrase "MSGT=DMM, SQN=000001, SQL=insert FP (called_no destination, disabled) values ('18006120269', '9725193464', 1) delete FP where called_no=18002336666;" allows the insertion of values corresponding to called number field 312, destination field 314, and enablement field 316. In addition, this one transaction allows deletion of record 306 having a destination field of 18002336666.

According to the embodiment illustrated in FIGS. 4A and 4B, available transactions include insertion of information, updating of information, and deleting of information contained in entries 310. In addition to a data manipulation message, each of the above-mentioned message types is described in greater detail below.

RESPONSE TO DATA MANIPULATION MESSAGE TYPE

A response to a database manipulation message indicates whether a request was successfully processed. If generic provisioning unit 202, 204 does not successfully process the request, a result code indicates an error. Otherwise the result code indicates a successful operation. The result code in a response to a database manipulation message is represented below by the term "RTCODE."

A successful operation response to a database manipulation message containing a single transaction may take the form a "MSG=RDMM, SQN=sequence no, RTCODE=0." A failure response to a database manipulation message having a single transaction may take the form of "MSGT=RDMM, SQN=sequence_no, RTCODE=1, 2, 3, 4, 5, or 6;". A response to multiple transactions in a database manipulation message may take the form "MSGT=RDMM, SQN=sequence_no 1, RTCODE=result_code 1: SQN=sequence_no 2, RTCODE=result_code 2: . . . SQN=sequence_no n, RTCODE=result_code n;".

According to one embodiment of the invention the following rules apply to responses to database manipulation messages. First, if generic provisioning unit 202, 204 detects a syntax error or a missing parameter in a database manipulation message, it rejects the entire database manipulation message. Generic provisioning unit 202, 204 returns a result code, denoted by the term "RTCODE" in the above example responses, set to "message_syntax_error" and the lowest SQN number found in the database manipulation message. For example, in the following example there is a syntax error (SQL %=) for SQN=0000060.

In addition, if generic provisioning unit 202, 204 finds no sequence number in the database manipulation message, it sets the sequence number to "FFFFFF." If the sequence number in a database manipulation message is less than the required number of digits, generic provisioning unit 202, 204 replaces the missing digits with "F"s, for example "FF2345." If the sequence number in a record retrieval message, discussed in greater detail below, is more than the required number of digits, generic provisioning unit 202, 204 truncates the end of the sequence number. For example, "00000008" is truncated to "000000."

If generic provisioning unit 202, 204 receives a database manipulation message before the completion of configuration, generic provisioning unit 202, 204 returns a response to a database manipulation message with the return code denoted by "RTCODE" set to "operation_not_ allowed." If generic provisioning unit 202, 204 cannot access the specified database or if other system problems occur, generic processing unit 202, 204 returns a response to a database manipulation message with the return code set to "system_failure" and the lowest sequence number found in the database manipulation message. If an error is returned from the database, generic provisioning unit 202, 204 returns a response to a database manipulation message with the return code set to "operation_failure." For multiple Standard Query Language transactions, the responses to Standard Query Language transactions are reported in the order of lowest sequence number found to the highest sequence number found in a database manipulation message. For example, in the following multiple Standard Query Language transaction message:

"MSGT=DMM, SQN=000008, SQL=sql_transaction: SN=000001,

SQL=sql_transaction: SQN=000009, SQL=sql_ transaction;"

the response is:

MSGT=RDMM, SQN=000001, RETCODE=0: SQN= 000008,

RETCODE=0: SQN=000009, RETCODE=0.

If generic provisioning unit 202, 204 sends a database manipulation message to all sites and the operation is not successful at all of the sites, generic provisioning unit 202, 204 returns a response to a database manipulation message with a return code set to "partial_successful_operation" and logs the error.

Record Retrieval Message Type

A record retrieval message retrieves a single record from database 206. A record retrieval message may take the form "MSGT=RRM, SQN=sequence_number, SQL=sql_ transaction" where "MSGT" denotes message type, "SQN" denotes the sequence number, and "SQL" denotes a standard query language transaction. For example, the record retrieval message "MSGT=RRM, SQN=000001, SQL= select called_no, destination, disabled from FP where called_no=18006120269;" retrieves a single record from a table named FP.

In one embodiment of the invention, several rules apply to record retrieval messages. Generic provisioning unit 202, 204 limits all Standard Query Language transactions to one single record retrieval. If other operations are attempted in the Standard Query Language transaction, generic provisioning unit 202, 204 returns a response to a record retrieval message with return code set to "operation_not_allowed." All table, record, and fields are handled by constraints defined in the schemes and triggers. In addition, according to one embodiment, the record retrieval message size must not exceed 300 k bytes. If the record retrieval message size is larger than 300 k bytes, generic provisioning unit 202, 204 returns a response to a record retrieval message with a return code set to "invalid_msg_size."

Generic provisioning unit 202, 204 also sends a record retrieval message to any one site if there are multiple sites. Therefore, the response to a record retrieval message only reflects the operation result on a chosen site.

Response to Record Retrieval Message Type

A response to a record retrieval message indicates if generic provisioning unit 202, 204 has successfully processed the request. If the request is not successfully processed, a result code indicates an error. Otherwise, the result code indicates a successful operation, and generic provisioning unit 202, 204 returns the desired record to user 132.

In one embodiment, the result code may take the value of any one of the integers 0 through 5. If the result code is set to 0, a successful operation is indicated. If the result code is not set to 0, an error is indicated. A value of 1 for result code indicates an operation failure; a value of 2 for the result code indicates a system failure; a value of 3 for the result code indicates a message syntax error; a value of 4 for the result code indicates that a specified operation is not allowed; and a value of 5 for a result code indicates an invalid message size.

A successful operation response to a record retrieval message may take the form "MSGT=RRRM, SQN= sequence_number, RTCODE=0, RTSTR=column1, column2, . . . , columnN, where RTSTR denotes column values within a subscriber record. A failure response to a record retrieval message may take the form: MSGT=RRRM, SQN=sequence_number, RTCODE=1, 2, 3, 4, 5, or 6. For example, the following is an example of a successful response to a record retrieval message: "MSGT=RRRM, SQN=000001, RTCODE=0, RTSTR=18006120269, 9728673344, 1." The following is an example of a failure response to a record retrieval message: "MSGT=RRRM, SQN=000002, RTCODE=2."

In one embodiment, several rules apply to responses to record retrieval messages. If generic provisioning unit 202, 204 cannot access database 206 or if other system problems occur, generic provisioning unit 202, 204 returns a response to a record retrieval message with a return code set to "system_failure." In addition, if generic provisioning unit 202, 204 detects a syntax error or a missing parameter in a record retrieval message, generic provisioning unit 202, 204 rejects the entire record response message. Generic provisioning unit 202, 204 returns a response to a record retrieval message with a return code set to "message_syntax_error" and with the sequence number that it found in the record retrieval message. If generic provisioning cannot find the sequence number in a record retrieval message, generic provisioning unit 202, 204 sets the sequence number to "FFFFFF." If the sequence number in a record retrieval message is less than the required number of digits, it replaces the missing digits with "F"s, for example, "FF2345". If the sequence number in a record retrieval message is more than the required number of digits, it truncates the end of the sequence number. For example, "00000008" is truncated to "000000."

If a generic provisioning unit 202, 204 receives a record retrieval message before the completion of configuration, it returns a response to a record retrieval message with a return code set to "operation_not_allowed." If an error is returned from the database, generic provisioning unit 202, 204 returns a response to a record retrieval message with a return code set to "operation_failure." For Varchar and Char column types, a response to a record retrieval message returns no quotation marks. The Varchar column type is a string of characters or telephone number type. The Char column type is a single character. If generic provisioning unit 202, 204 does not find a desired row during a select Standard Query Language command, generic provisioning unit 202, 204 returns a return code of "operation_failure"

and no RTSTR value. RTSTR stand for return or result string of characters. In the present case, a list of column's values within a subscriber record.

Configuration Message Type

A configuration message configures and programs generic provisioning unit 202, 204. A configuration message may take the form "MSGT=CFGM, SQN=000001, DBNAME=database_name, DBUID=database_user_id, DBPWD=database_user_password," where DBNAME denotes the desired database name, DBUID denotes the user identification for the desired database, and DBPWD denotes the password associated with the user identified for the desired database. An example of such a message is as follows: "MSGT=CFGM, SQN=sequence_number, DBNAME=DSC, DBUID=DSC, DBPWD=ISP."

According to one embodiment of the invention several rules apply to configuration messages. In one embodiment, generic provisioning unit 202, 204 allows a user 132 multiple attempts to send a configuration message until the configuration is successful. If generic provisioning unit 202, 204 receives a configuration message after completion of the configuration, it returns a response to configuration message with a return code set to "operation_not allowed." A configuration message size must not exceed 300 k bytes. In that same embodiment, if the configuration message size is larger than 300 k bytes, generic provisioning unit 202, 204 returns a response to configuration message with return code set to "invalid_msg_size."

Response to Configuration Message Type

A response to a configuration message indicates whether generic provisioning unit 202, 204 successfully processed a message. If the message was not successfully processed, generic provisioning unit 202, 204 returns a result code indicating an error. Otherwise the result code indicates a successful operation. A successful response to a configuration message may take the form "MSGT=RCFGM, SQN=sequence_number, RTCODE=0." A failure response to a configuration message may take the form "MSGT=RCFGM, SQN=sequence_number, RTCODE=1, 2, 3, 4, 5, or 6." For example, an example of a successful response to a configuration message is "MSGT=RCFGM, SQN=000001, RTCODE=0." An example of a failure response to a configuration message is "MSGT=RCFGM, SQN=000002, RTCODE=2."

The result code may have a value of an integer 0 through 6, with 0 indicating a successful operation. A "1" indicates an operation failure; a "2" indicates a system failure; a "3" indicates a message syntax error; a "4" indicates that the configuration message contain an operation that is not allowed; a "5" indicates an invalid message size; and a "6" indicates a partially successful operation.

In one embodiment, several rules apply to responses to configuration messages. If generic provisioning unit 202, 204 cannot access database 206 or if other system problems occur, generic provisioning unit 202, 204 returns a response to configuration message with return code set to "system_failure." In addition, if generic provisioning unit 202, 204 detects a syntax error or a missing parameter, it rejects the entire configuration message. In such a case, generic provisioning unit 202, 204 returns a response to configuration message with a return code set to "message_syntax_error" and with the sequence number found in the configuration message. If no sequence number can be found in a configuration message, generic provisioning unit 202, 204 sets the sequence number to "FFFFFF." If the sequence number in a configuration message is less than the required number of digits, generic provisioning unit 202, 204 replaces the missing digits with "F"s, for example "FF2345." If the sequence number in a configuration message is more than the required number of digits, generic provisioning unit 202, 204 truncates the end of the sequence number. For example, "00000008" is truncated to "000000." If the requested operation is not successfully processed, generic provisioning unit 202, 204 returns a response to configuration message with a return code set to "operation_failure." If generic provisioning unit 202, 204 sends a configuration message to all sites and the operation is not successful on all of the sites, generic provisioning unit 202, 204 returns a response to configuration message with a return code set to "partial_successful_operation" and logs the error information.

Once database 206 is accessed with a database manipulation message and the message is executed within database 206, an operation failure or a success response is sent at step 416 to generic provisioning unit 202, 204. The sending of a operation failure or success response is also illustrated in FIG. 4A by reference numeral 416. Generic provisioning unit 202, 204 transmits at step 418 the response to the database manipulation message from generic provisioning unit 202, 204 to user 132. This transmission is also illustrated in FIG. 4B by reference numeral 418. Multiple messages may be sent in this fashion, and steps 412 through 418 may be repeated until no additional messages are desired. A check is performed at step 420 for additional messages. The communication of provisioning information between user 132 and database 206 according to generic provisioning interface 216 concludes at step 422.

Thus, generic provisioning interface 216 provides an interface to provision a database that does not require modification when schemas, or table structures, within the database are changed, which is desirable because the time and expense in implementing new services is greatly reduced because a new interface does not have to be created each time a new service is added.

In addition to provisioning messages, generic provisioning interface 216 provides for maintenance messages addressing the maintenance of database 206.

Maintenance messages are used to obtain service control point 104 status and information and to locate the active platform manager node within a service control point, such as service control point 104. A service control point may include an active platform manager node and an inactive platform manager node; however, provisioning messages are transmitted through the active platform manager. Therefore, it is desirable to be able to locate the active platform manager node. According to one embodiment, maintenance messages include a site name retrieval message and an associated response message, an active and in-service platform manager retrieval message and an associated response message, and an all node information retrieval message and an associated response message.

Figure 5A:
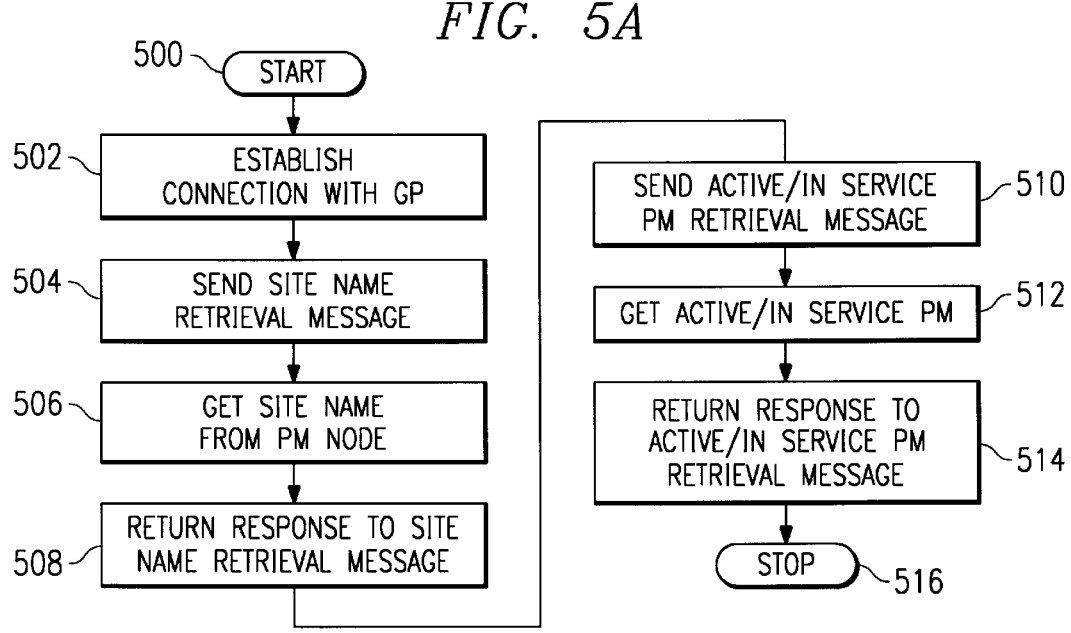
FIG. 5A is a flow chart showing exemplary steps associated with testing a generic provisioning interface.
Figure 5B:
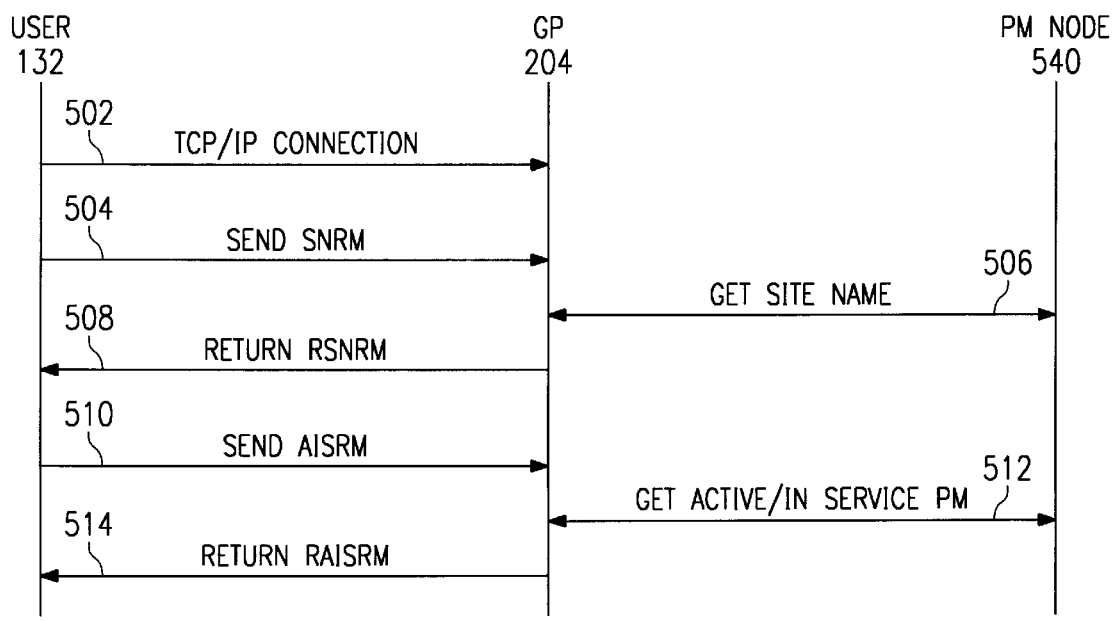
FIG. 5B is a simplified block diagram of a portion of an exemplary telecommunications network illustrating components used in testing a generic provisioning interface.

FIG. 5A is a flowchart illustrating exemplary steps associated with communication of maintenance message information from user 132 to database 206. FIG. 5B is a simplified block diagram illustrating exemplary maintenance message usage. According to one embodiment of the invention, communication according to generic provisioning interface 216 includes step 502 of establishing a TCP/IP connection between user 132 and generic provisioning unit 202, 204. Establishment of a TCP/IP connection between user 132 and generic provisioning unit 202, 204 is also illustrated in FIG. 5B and is represented by reference numeral 502. Once a TCP/IP connection has been established between user 132 and generic provisioning unit 202, 204 a site name retrieval message may be sent to generic provisioning unit 204 to obtain a local site name for all remote site names. The sending of a site name retrieval message at step 504 is also illustrated in FIG. 5B by reference numeral 504. A local site name or all remote site names are retrieved from a platform manager node 540 and returned to generic provisioning unit 204 for return to user 132 at step 508. Step 508 includes transmission of a response to a site name retrieval message. Details of a site name retrieval message and a response to a site name retrieval message are described below.

Another maintenance message example includes a send active and in-service platform manager retrieval message, which retrieves the active platform manager of service control point 104. The sending of an active and in-service platform manager retrieval message is illustrated at step 510 and also illustrated in FIG. 5B by reference numeral 510. Once an active and in-service platform manager retrieval message is received by generic provisioning unit 204, the active and in-service platform manager is retrieved from platform manager node 540 and returned to generic provisioning unit 204 at step 512. At step 514, a response to an active and in-service platform manager retrieval message is returned to user 132. Details regarding an active and in-service platform manager message and a response to an active/in-service platform manager retrieval message are described in greater detail below.

Site Name Retrieval Message

A site name retrieval message retrieves the local site name or all remote site names. A site name retrieval message may take the form "MSGT=SNRM, SQN=sequence_number." If generic provisioning unit 202, 204 detects a syntax error in a site name retrieval message, generic provisioning unit 202, 204 rejects the entire site name retrieval message. Generic provisioning unit 202, 204 returns a response to a site name retrieval message with a return code set to "message_syntax_error" and with the sequence number that it found in the site name retrieval message. If generic provisioning unit 202, 204 cannot find the sequence number in a site name retrieval message, generic provisioning unit 202, 204 sets the sequence number to "FFFFFF." If the sequence number in a site name retrieval message is less than the required number of digits, generic provisioning unit 202, 204 replaces the missing digits with "F"s, for example, "FF2345." If the sequence number in a site name retrieval message is more than the required number of digits, generic provisioning unit 202, 204 truncates the end of the sequence number. For example, "00000008" is truncated to "000000."

Response to Site Name Retrieval Message

A response to a site name retrieval message indicates whether generic provisioning unit 202, 204 successfully processed the request. If the request is not successfully processed, a result code indicates an error. Otherwise, the result indicates a successful operation and returns all retrieved site names. A successful operation response to a site name retrieval message may take the form "MSGT=RSNRM, SQN=sequence_number, RTCODE=0, SITENAME=site1, site2, . . . , siteN", where the term "SITENAME" refers to the name of a site. A failure or a partial response to a site name retrieval message may take the form: "MSGT=RSNRM, SQN=sequence_number, RTCODE=2, 3, or 6." For example, an example of a successful response to a site name retrieval message is "MSGT=RSNRM, SQN=000001, RTCODE=0, SITENAME=SCP1, SCP2." An example of a failure response to a site name retrieval message is "MSGT=RSNRM, SQN=000001, RTCODE=2."

In one embodiment a number of rules apply to responses to site name retrieval messages. If generic provisioning unit 202, 204 cannot access any site within a certain time period, generic provisioning unit 202, 204 returns a response to a site name retrieval message with a return code set to "system failure." If generic provisioning unit 202, 204 detects a syntax error, generic provisioning unit 202, 204 rejects the entire message and returns a response to a site name retrieval message with a return code set to "message_syntax_error." If generic provisioning unit 202, 204 can only retrieve some of the remote site names, it returns a response to a site name retrieval message with a return code set to "partial_successful_operation."

Active And In-Service Platform Manager Retrieval Message Type

An active and in-service platform manager retrieval message retrieves the active and in-service platform manager node for a given site. Such a message may take the form of "MSGT=AISRM, SQN=sequence_number, SITENAME=site_name." For example, an active and in-service platform manager retrieval message example is "MSGT=AISRM, SQN=000001, SITENAME=SCP1." In this context, the term AISRM denotes an active and in-service site name retrieval message. If generic provisioning unit 202, 204 detects a syntax error in an active and in-service site name retrieval message, generic provisioning unit 202, 204 rejects the entire active and in-service site name retrieval message. Generic provisioning unit 202, 204 returns a response to an active and in-service site name retrieval message with a return code set to "message_syntax_error" and with the sequence number that it found in the active and in-service site name retrieval message. If generic provisioning unit 202, 204 cannot find the sequence number in an active and in-service site name retrieval message, generic provisioning unit 202, 204 sets the sequence number to "FFFFFF." If the sequence number in an active and in-service site name retrieval message is less than the required number of digits, generic provisioning unit 202, 204 replaces the missing digits with "F"s, for example, "FF2345." If the sequence number in an active and in-service site name retrieval message is more than the required number of digits, generic provisioning unit 202, 204 truncates the end of the sequence number. For example, "00000008" is truncated to "000000."

Response to Active and In-Service Platform Manager Retrieval Message Type

A response to active and in-service platform manager retrieval message indicates whether or not generic provisioning unit 202, 204 successfully processed the request. If the request was not successfully processed, a result code indicates an error. Otherwise, the result code indicates a successful operation and returns the active and in-service platform manager node for a given site. A successful operation response to an active and in-service platform manager retrieval message may take the form "MSGT=RAISRM SQN=sequence_number, RTCODE=0, ACTINS=the active and in-service platform manager node name." In this context, the term "ACTINS" denotes the active and inservice platform manager node name, and the term "RAISRM" specifies a response to an active and in-service site name retrieval message type. A failure response to an active and in-service platform manager retrieval message may take the form "MSGT=RAISRM, SQN=sequence_number, RTCODE=1, 2, or 3." For example, the following is an example of a successful response to an active and in-service platform manager retrieval message: "MSGT=RAISRM, SQN=000001, RTCODE=0, ACTINS=SCP100." The following is an example of a failure response to an active and in-service platform manager retrieval message: "MSGT=RAISRM SQN=000001, RTCODE=1".

In one embodiment, a number of rules apply to responses to active and in-service platform manager retrieval messages. If generic provisioning unit 202, 204 cannot retrieve the active and in-service platform manager node within a certain time period because of a TCP link problem or a node problem, generic provisioning unit 202, 204 returns a response to active and in-service site name retrieval message with a return code set to "system_failure." If there is no active and in-service platform manager node in the site, generic provisioning unit 202, 204 returns a response to an active and in-service site name retrieval message with a return code set to "operation_failure." If generic provisioning unit 202, 204 determines that the given site name does not exist in the system, generic provisioning unit 202, 204 returns an active and in-service site name retrieval message with RTCODE set to "operation_failure." If generic provisioning unit 202, 204 detects a syntax error, generic provisioning unit 202, 204 rejects the entire message and returns a response to an active and in-service site name retrieval message with a return code set to "message_syntax_error."

All Nodes Information Retrieval Message

An all nodes information retrieval message retrieves all nodes information for a given site. Such a message may take the form "MSGT=ANIRM, SQN=sequence_number, SITENAME=site_name." For example, the following is an example of an all nodes information retrieval message: "MSGT=ANIRM, SQN=000001, SITENAME=SCP1." If generic provisioning unit 202, 204 detects a syntax error in an active and in-service site name retrieval message, generic provisioning unit 202, 204 rejects the entire active and in-service site name retrieval message. Generic provisioning unit 202, 204 returns a response to an active and in-service site name retrieval message with a return code set to "message_syntax_error" and with the sequence number in the active and in-service site name retrieval message. If generic provisioning unit 202, 204 cannot find the sequence number in an active and in-service site name retrieval message, generic provisioning unit 202, 204 sets the sequence number to "FFFFFF." If the sequence number in an active and in-service site name retrieval message is less than the required number of digits, generic provisioning unit 202, 204 replaces the missing digits with "F"s, for example, "FF2345." If the sequence number in an active and in-service site name retrieval message is more than the required number of digits, generic provisioning unit 202, 204 truncates the end of the sequence number. For example, "00000008" is truncated to "000000."

Response to All Nodes Information Retrieval Message

A response to all nodes information retrieval messages indicates whether or not generic provisioning unit 202, 204 successfully processed the request. If the request is not successfully processed, the result code indicates an error. Otherwise, the result code indicates a successful operation and returns the desired nodes information for a given site. A successful operation response to an all nodes information retrieval message may take the form "MSGT=RANIRM, SQN=sequence_number, RTCODE=0, NUMNODES=N, NODENAME=node1, NODETYPE=node1_type, NODEMODE=node1_mode, NODESTATUS=node1_status:NODENAME=node2, NODETYPE=node2_type, NODEMODE=node2_mode, NODESTATUS=node2_status: . . . . NODENAME=nodeN, NODEYTPE=nodeN_type, NODEMODE=nodeN_mode, NODESTATUS=nodeN_status." In this context, the term "RANIRM" denotes a response to an all nodes information retrieval message type; the term "NUMNODES" denotes the number of nodes; the term "NODENAME" denotes the name of a desired node; the term "NODETYPE" denotes the type of the desired node; the term "NODEMODE" denotes the status of the node, such as, for example, "ACTIVE" or "STANDBY"; and the term "NODESTATUS" denotes the status of the desired node. A failure response to an all nodes information retrieval message may take the form "MSGT=RANIRM, SQN=sequence_number, RTCODE=2 or 3." For example, an example of a successful response to an all nodes information retrieval message is: "MSGT=RANIRM, SQN=000001, RTCODE=0, NUMNODES=2, NODENAME=SCP100, NODETYPE=PM_NODE, NODEMODE=ACTIVE_PM, NODESTATUS=ISV_ENABLED: NODENAME=SCP101, NODE-TYPE=PM_NODE, NODEMODE=STANDBT_PM, NODESTATUS=OS_MIN." An example of a failure response to an all nodes information retrieval message is: "MSGT=RANIRM, SQN=000001, RTCODE=2." If generic provisioning unit 202, 204 cannot obtain the node information within a certain time period, generic provisioning unit 202, 204 returns a response to an active and in-service site name retrieval message with a return code set to "system_failure." If generic provisioning unit 202, 204 detects a syntax error, generic provisioning unit 202, 204 rejects the entire message and returns response to an active and in-service site name retrieval message with a return code set to "message_syntax_error."

Although a particular embodiment for maintenance messages has been described, applications and variations may be made without departing from the scope of the present invention. Thus, generic provisioning interface 216 provides an interface provision, a database that does not require modification when schemas, or table structures, within the database are changed, which is desirable because the time and expense in implementing new services is greatly reduced because a new interface does not have to be created each time a new service is added.

Figure 6A:
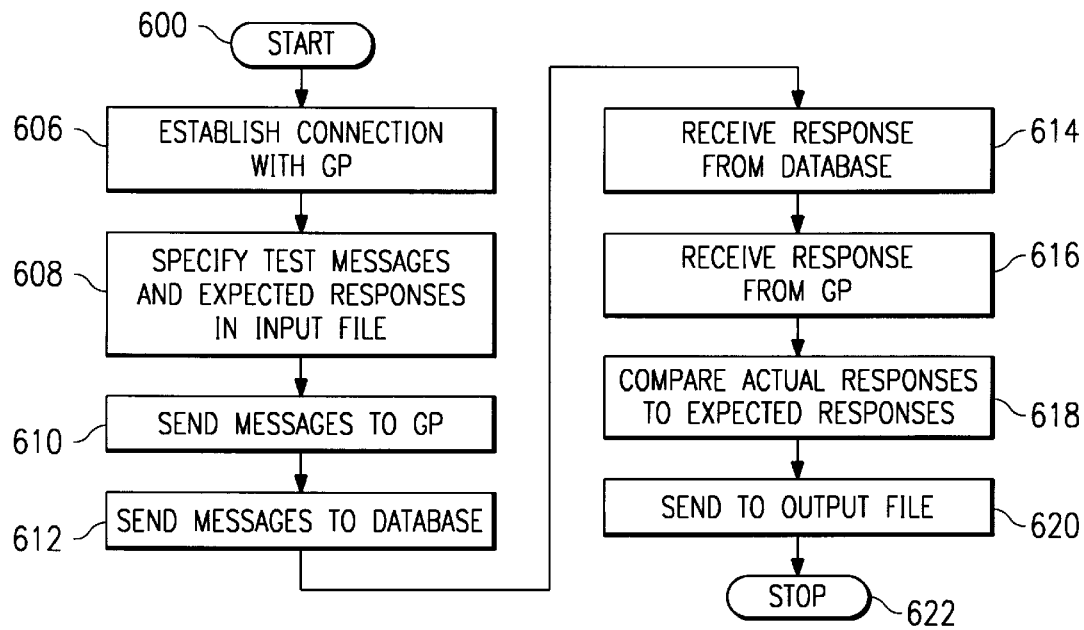
FIG. 6 is a simplified block diagram illustrating portions of the telecommunications network illustrated in FIG. 5A, further showing details of an input file and an output file associated with testing a generic provisioning interface.
Figure 6B:
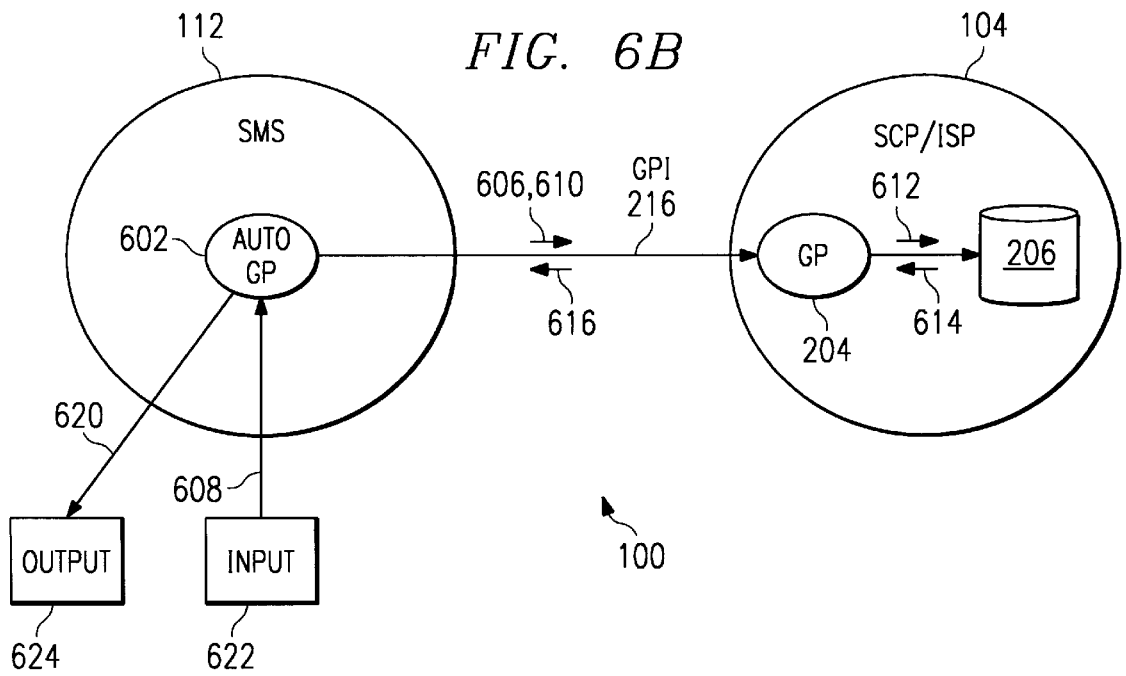

FIG. 6A is a flow chart showing exemplary steps associated with testing provisioning of database 206, and FIG. 6B is a simplified block diagram of a portion of an exemplary telecommunications network illustrating components used in testing provisioning of database 206. As illustrated in FIGS. 6A and 6B, an automatic generic provisioning test unit 602 may be included in-service management system 102 for testing provisioning of database 206, particularly after modification of database 206. Modification of database 206 includes addition of tables to database 206 and modifications of tables within database 206.

A method for automatically testing generic provisioning of database 206 begins at step 600, illustrated in FIG. 6A. At step 606 a connection, such as a TCP/IP connection, is established with a generic provisioning unit 204 within a desired telecommunications node. The desired telecommunications node may be, for example, and service management system, a service control point, or an intelligent service peripheral containing database 206. Establishment of such a connection is also illustrated in FIG. 6B by reference numeral 606. Once a connection is established between automatic generic provisioning test unit 602 and generic provisioning unit 204, a plurality of test messages together with expected response to the test messages may be transmitted to generic provisioning unit 204 from automatic generic provisioning test unit 602 according to generic provisioning interface 216 step 610. Because generic provisioning interface 216 is utilized, the content and format of the test messages and expected responses may be quickly and easily determined, in contrast to conventional systems that require a new interface whenever a database, such as database 206, is modified. The plurality of test messages and expected responses may be received from an input file 622 at step 508. Input file 622 is illustrated in greater detail in FIG. 7.

Reception of test messages and expected results contained in input file 622 by automatic generic provisioning test unit 602 is also illustrated in FIG. 6B by reference numeral 608, and transmission of expected responses to generic provisioning unit 204 is also illustrated in FIG. 6B by reference numeral 610. Generic provisioning unit 204 may send the test messages to database 206 at step 612 and receive responses from database 206 at step 614. Steps 612 and 614 are also illustrated in FIG. 6B by reference numerals 612 and 614, respectively. The responses may then be received by automatic generic provisioning test unit 602 from generic provisioning unit 204 at step 616 according to generic provisioning interface 216. Because generic provisioning interface is utilized, the content and format of the expected responses may be easily determined for comparison to the actual responses, in contrast to conventional systems that require a new interface whenever a database, such as database 206, is modified. Step 616 is also illustrated in FIG. 6B by reference numeral 616. At step 618 the actual responses may be automatically compared to the expected responses by automatic generic provisioning test unit 602, with the result transmitted to an output file 624 at step 620. Step 620 is also illustrated in FIG. 5B by reference numeral 620.

Figure 7:
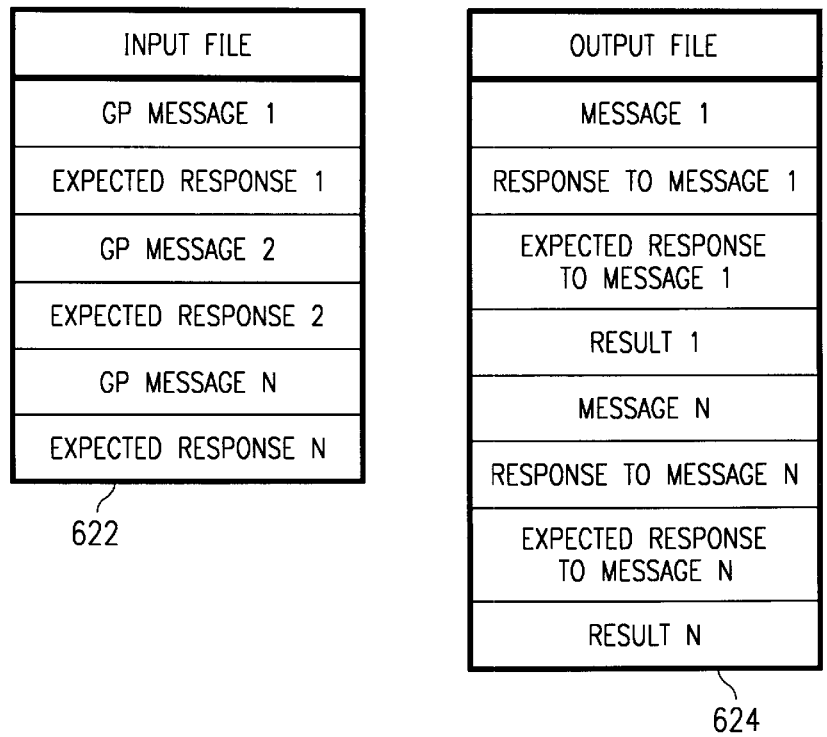
FIG. 7A is a block diagram of a portion of an exemplary telecommunications network illustrating an automated generic provisioning interface verification process.
FIG. 7B is a flow chart illustrating exemplary steps associated with automatically verifying a generic provisioning interface.

FIG. 7 is a simplified block diagram illustrating portions of telecommunications network 100 illustrated in FIG. 6B, further showing details of input file 622 and output file 624 associated with testing generic provisioning interface 216. As illustrated, input file 622 includes a plurality of generic provisioning messages, such as a database manipulation message and expected response. Output file 624 comprises a plurality of sets of information containing the provisioning message contained in input file 622, the actual response to the provisioning message, the expected response to the provisioning message, and a result indicative of a comparison of the expected response to the actual response. The result may indicate whether the expected response and the actual response matched.

Thus, through the use of automatic generic provisioning test unit 602, provisioning of database 206 may be rapidly and automatically verified, alleviating the need for a programmer to manually determine the content of and send test messages to a database, receive the response from the database, determine the content of the expected response, and compare the expected response to the actual response. Such manual testing has proven cumbersome and time consuming, particularly because each modification to the database required modification of an associated interface for communicating provisioning information. Therefore, generation of a test message and an expected response was not an insignificant task.

Figure 8A:
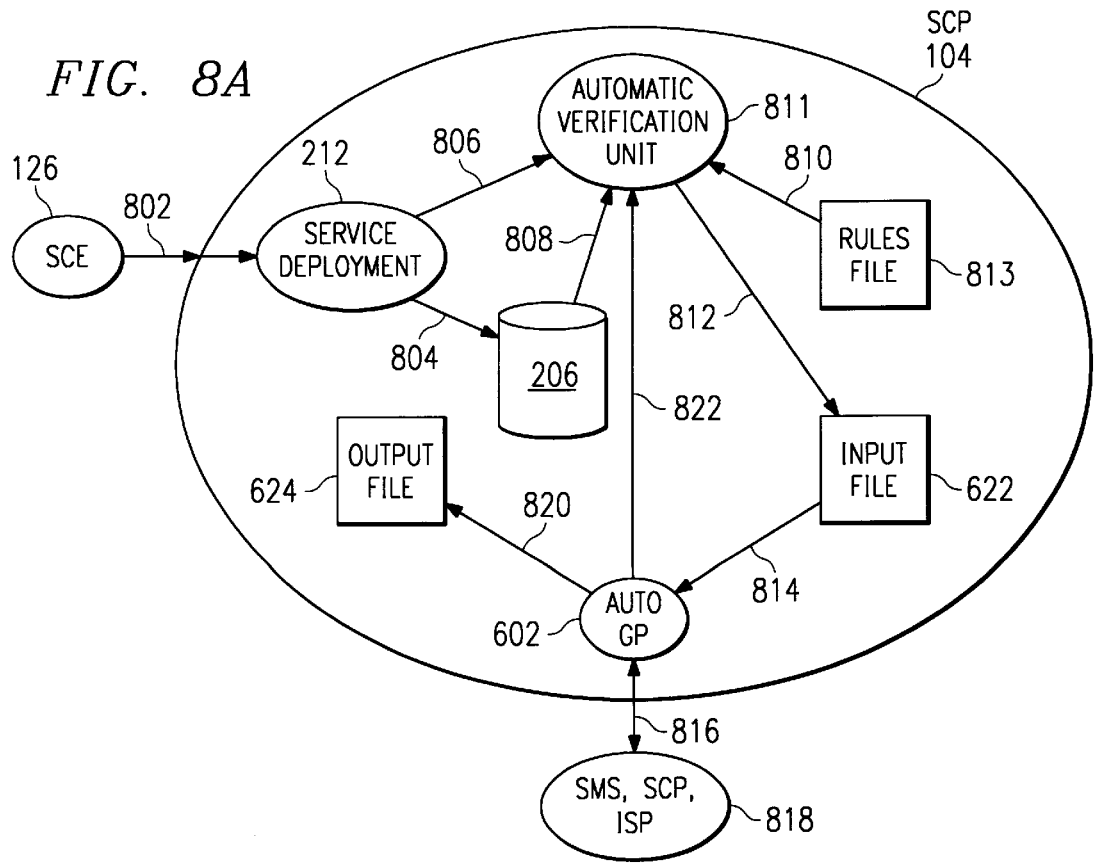
FIG. 8A is a block diagram illustrating an exemplary telecommunications provisioning system.
Figure 8B:
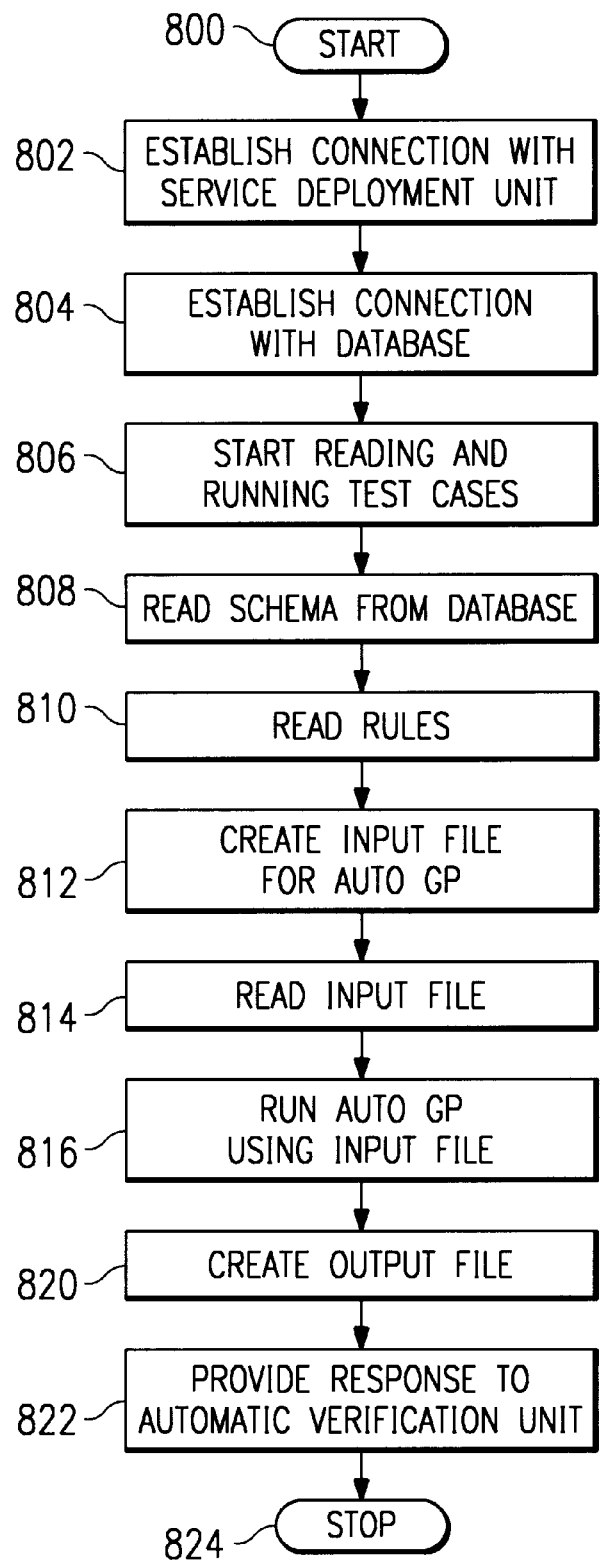
FIG. 8B is a flow chart of the method for provisioning of the database.

FIG. 8A is a block diagram of a portion of an exemplary telecommunications network 100 illustrating an automated telecommunication provisioning verification system, and FIG. 8B is a flow chart illustrating exemplary steps associated with automatically verifying provisioning of database 206.

According to the invention, service control point 104 includes an automatic verification unit 811 that, in cooperation with other elements of service control point 104, allows the automatic generation of test messages and automatic testing of provisioning of database 206. Also included in-service control point 104 is a rules file 813. Rules file 813 includes information that allows automatic verification unit 811 to automatically generate test messages based on the structure of tables contained in database 206. Service control point 104 also includes automatic generic provisioning testing unit 602, input file 622, and output file 624, discussed above with reference to FIGS. 7A, 7B, and 8.

Automatically verifying provisioning of database 206 begins with step 800. A first step 802 in automatically verifying provisioning of database 206 is step 802 of establishing a connection between service creation environment 126 and service deployment portion 212 contained within service control point 104. Step 802 is also illustrated in FIG. 8B by reference numeral 802. Service deployment portion 212 then establishes a connection with database 206 at step 804, also illustrated in FIG. 8A by reference numeral 804. Database 206 is shown in FIG. 8A as contained within service control point 104 for clarity of illustration; however, database 206 is more typically contained within an external service management system, service control point, or intelligent service peripheral 818, which is discussed in greater detail below. At step 806 service deployment portion 212 directs automatic verification unit 811 to begin testing provisioning of database 206, which is also illustrated in FIG. 8A by reference numeral 806. As a first step in testing provisioning of database 206, automatic message verification unit 811 obtains schema information, or table structure information, from database 206 at step 808. Step 808 is also illustrated in FIG. 8A by reference numeral 808. In addition, at step 808 trigger information may be read from database 206. As described above, trigger information provides constraints on the ways in which a database may be operated upon. For example, an attempt to insert a value into a column that is a different type or size is prevented by a trigger. Accessing of schema and trigger information at step 808 allows automatic generation of test messages and expected responses.

At step 810 automatic verification unit 811 accesses rules file 813 and generates a set of test messages with associated expected responses based on the accessed schema information. The test messages and expected responses are stored in an input file, such as input file 622 discussed above. Step 810 is also illustrated in FIG. 8A by reference numeral 810. At step 814 the contents of input file 622 are read by automatic generic provisioning testing unit 602, as described above, and at step 816 these test cases are transmitted by automatic generic provisioning testing unit 602 for eventual receipt by a desired database contained within an external service management system, service control point, or intelligent service peripheral 818, such as database 206. Receipt of actual responses also occurs at step 816. Service management system, generic control point, or intelligent peripheral 818 may include a generic provisioning unit such as generic provisioning unit 204 and transmission and receipt of test messages and responses at step 816 may be according to generic provisioning interface 216 to facilitate generation of test messages and expected responses. Step 816 is also illustrated in FIG. 8A. The results of step 816 are provided to output file 624 at step 820, also illustrated in FIG. 8A. In addition, a response is provided to automatic verification unit 811 at step 822. Such a response informs user 132 whether databases contained within service management system, service control point, or intelligent service peripheral 818 have been provisioned properly. Automatic verification of telecommunications provisioning concludes at step 824.

Thus, the invention provides a method for automatically generating test messages and expected responses to verify provisioning of databases. Thus the invention provides a fast, accurate, and cost effective method and system for verifying provisioning a database and therefore verifying the availability of a call service.

Although particular embodiments have been described in detail, it should be understood that various changes, substitutions, and alterations can be made herein without departing from the spirit and scope of the present invention as defined by the following claims.

What is claimed is:

1. A method for automatically verifying provisioning of a telephony database, the telephony database comprising a plurality of tables, each table associated with a telephony service and having a table structure, the method comprising the steps of:

receiving from the telephony database a first table structure of a first table within the telephony database;

automatically generating a plurality of test messages and expected responses for testing provisioning of the first table within the telephony database, the test messages having a format corresponding to the first table structure;

transmitting the plurality of test messages for receipt by the database;

receiving a plurality of actual responses to the plurality of test messages;

comparing the plurality of actual responses to the plurality of expected responses; and generating a result based on comparing the plurality of actual responses to the plurality of expected responses.

2. The method of claim 1, wherein the step of automatically generating a plurality of test messages and expected responses comprises accessing a rules file having rules allowing automatic generation of test messages and expected responses based on the first table structure.

3. The method of claim 1, and further comprising the steps of:

modifying the first table structure of the first table within the telephony database to produce a modified table having a second table structure;

receiving from the telephony database the second table structure for the modified database; and automatically generating a plurality of test messages and expected responses for testing provisioning of the modified table.

4. The method of claim 3, wherein the step of automatically generating a plurality of test messages and expected responses for testing provisioning of the modified table comprises accessing a rules file having rules allowing automatic generation of test messages and expected responses based on the second table structure.

5. The method of claim 1, wherein the step of automatically generating a plurality of test messages and expected responses for testing provisioning of the first table comprises automatically generating a input file for accessing by a generic provisioning test unit, the generic provisioning test unit operable to transmit generic provisioning messages according to a generic provisioning protocol.

6. The method of claim 1, and further comprising creating an output file having the plurality of test messages, the plurality of expected responses, the plurality of actual responses, and a plurality of results from comparing the plurality of actual responses to the plurality of expected responses.

7. The method of claim 1, wherein the step of transmitting the plurality of test messages for receipt by the database comprises transmitting, by a generic provisioning unit, the content of the plurality of test messages to the database.

8. A method for automatically verifying provisioning of a telephony database, the method comprising the steps of:

receiving from the telephony database a first table structure for a first table within the telephony database;

automatically generating, based on the first table structure, a test provisioning message operable to provision a table having the first table structure;

automatically generating an expected response to the test provisioning message;

transmitting the test provisioning message;

receiving an actual response to the test provisioning message;

comparing the actual response to the expected response; and generating a result based on comparing the actual response to the expected response.

9. The method of claim 8, wherein the step of automatically generating, based on the first table structure, a test provisioning message operable to provision a table having the first table structure comprises accessing a rules file having rules for generating provisioning messages based on the structure of a table to be provisioned.

10. The method of claim 8, wherein the step of transmitting the test provisioning message comprises:

transmitting the test provisioning message to a provisioning unit; and providing the content of the provisioning message from the provisioning unit to the database.

11. The method of claim 8, wherein the step of automatically generating an expected response to the test provisioning message further comprises generating an input file comprising a plurality of test messages.

12. The method of claim 11, and further comprising accessing, by a automatic testing unit, the input file and wherein the step of transmitting the test provisioning message comprises transmitting, by the automatic testing unit, the test provisioning message to a provisioning unit.

13. The method of claim 8, wherein the step of a first table structure comprises receiving a schema and trigger information for the first table.

14. A system for verifying provisioning of telecommunications services, the system comprising:

a first telecommunications node comprising:

an automatic testing unit operable to:

transmit test messages to a provisioning unit for confirming provisioning of a database associated with telephony services;

receive actual responses to the test messages;

compare the actual responses to the expected responses; and generate a result based on the comparison of the actual responses to the expected responses; and an automatic verification unit operable to:

receive a table structure for the database; and automatically generate a plurality of test messages and expected responses based on the table structure for transmission to the automatic testing unit; and a second telecommunications node comprising the database.

15. The system of claim 14, wherein the first telecommunications node comprises a service control point system.

16. The system of claim 14, wherein the second telecommunications node comprises a service control point system.

17. The system of claim 14, wherein the first telecommunications node further comprises a rules file having rules for facilitating generation of provisioning messages based on the structure of a table to be provisioned.

18. The system of claim 14, wherein the automatic test unit is further operable to generate an output file having the result.

19. The system of claim 14, wherein:
   the automatic test unit is further operable to receive a plurality of test cases from an input file; and
   the automatic verification unit is further operable to generate the input file.

20. The system of claim 14, and further comprising a plurality of telecommunication nodes, each telecommunications node having a provisioning unit and an associated database and wherein the generic provisioning unit is further operable to replicate test messages and transmit provisioning messages to each provisioning unit in each telecommunications node.

* * * * *